United States Patent [19]

Schuberth et al.

[11] 4,296,292
[45] Oct. 20, 1981

[54] VARIABLE ELECTROMECHANICAL DEVICE

[75] Inventors: Christian Schuberth, Bad Neustadt; Rudolf Hartmann, Salz, both of Fed. Rep. of Germany

[73] Assignee: Preh Elektrofeinmechanische Werke Jakob Preh Nachf. GmbH & Co., Bad Neustadt, Fed. Rep. of Germany

[21] Appl. No.: 94,891

[22] Filed: Nov. 16, 1979

[30] Foreign Application Priority Data

Nov. 24, 1978 [DE] Fed. Rep. of Germany ....... 2850835

[51] Int. Cl.³ .................... H01H 3/08; H01C 10/00
[52] U.S. Cl. .................. 200/336; 338/184; 338/199; 338/334
[58] Field of Search .................. 200/293, 301, 336; 338/162, 164, 174, 175, 184, 199, 334

[56] References Cited

U.S. PATENT DOCUMENTS

| | | | |
|---|---|---|---|
| 2,231,540 | 2/1941 | Lodge | 338/164 |
| 2,521,561 | 9/1950 | Batcheller | 200/296 |
| 2,534,356 | 12/1950 | Kramer | 338/174 |
| 2,981,914 | 4/1961 | Young | 338/174 |
| 3,007,127 | 10/1961 | Clayton | 338/174 |
| 3,129,400 | 4/1964 | Hartman | 338/162 |
| 3,373,257 | 3/1968 | Matthias et al. | 200/330 |
| 3,902,152 | 8/1975 | Van Benthuysen | 338/162 |

FOREIGN PATENT DOCUMENTS

| | | |
|---|---|---|
| 2005201 | 8/1971 | Fed. Rep. of Germany . |
| 2304199 | 8/1973 | Fed. Rep. of Germany . |
| 732724 | 8/1976 | Fed. Rep. of Germany . |
| 7708312 | 7/1977 | Netherlands .......... 200/336 |
| 1243118 | 8/1971 | United Kingdom . |

*Primary Examiner*—John W. Shepperd
*Attorney, Agent, or Firm*—Schwartz, Jeffery, Schwaab, Mack, Blumenthal & Koch

[57] ABSTRACT

A variable electromechanical device, such as a rotary potentiometer, includes a housing with a sleeve having a bore through which an actuation shaft extends. The shaft is provided with an annular groove. A portion of the sleeve is displaced by stamping so that it extends into the annular groove of the shaft to prevent axial movement of the latter. A projection formed on the shaft within the annular groove cooperates with the displaced portion of the sleeve for limiting the rotation of the shaft. A lubricating and braking liquid of high viscosity is filled in the groove, and one or more passages are formed on the projection so that the liquid can pass from one side of the projection to the other side thereof when the shaft is rotated.

7 Claims, 4 Drawing Figures

VARIABLE ELECTROMECHANICAL DEVICE

BACKGROUND OF THE INVENTION

This invention relates to a variable electromechanical device, such as a rotary potentiometer, a rotary switch, or similar devices which are actuated by means of a rotary shaft.

To ensure safe and proper operation, the axial play of the shaft within the device housing should not be excessive. To meet with this requirement, it is known to cut an annular groove in the shaft and to provide a pin penetrating a wall of the housing and engaging the groove. It is furthermore known to secure shafts by retaining rings or discs disposed in annular grooves. Furthermore, axial movement of the shaft can be prevented by a wire clamp which extends through a wall of the housing and engages an annular groove provided at an according location of the actuation shaft. A further arrangement for preventing axial movement of the shaft relative to the housing is known, in which a thrust washer and a spacer disc are disposed between the housing and the flange of a threaded sleeve. The spacer disc has a sector-shaped recess in which a retainer is inserted. This retainer is held by bending a projecting portion of the thrust washer and engages an annular groove of the actuation shaft. The rather great number of individual parts renders this arrangement very complicated and expensive.

It is furthermore known to retain the actuation shaft in a potentiometer housing by providing on the housing four resilient detent noses which engage at least one annular groove of the actuation shaft without play. It is a disadvantage of this arrangement, however, that the detent noses, while resisting pressure on the shaft, may spread apart under tension and depending on the respective chamfering provided, so that the shaft is no securely retained. In the known arrangement, an extension is formed on the housing which serves as both a stop for the spring carrier of the potentiometer and a holder for the collector thereof.

A variable resistor is also known, in which an actuation shaft is rotatably mounted in a housing. A second shaft has a sleeve-shaped extension which is fit onto an end of the actuation shaft. A portion of the extension is pressed into an annular groove of the actuation shaft and bears against the wall of the groove. A flattening of the shaft at the end thereof forms a projection which bears against a projecting collar located in the bore of the sleeve-shaped extension. This achieves a retaining of the shaft against pressure and tension.

Furthermore, a method of forming a spindle resistor is known in which the spindle on which the spring carrier is mounted, is retained in a housing by means of ultrasonic welding. The spindle has a threaded shaft with a conical tip and an annular groove formed by projecting ribs. During production, one end of the spindle is pressed into the housing and fixed there by means of ultrasonic vibrations and axial pressure. Also by ultrasonic means, softened thermoplastic material of the housing flows into the annular groove, thereby forming a second bearing for the spindle. The spindle is thereby retained against pressure and tension.

SUMMARY OF THE INVENTION

It is an object of the invention to provide a variable electromechanical device, such as a rotary potentiometer or rotary switch, in which the actuation shaft is retained against pressure and tension by a minimum of inexpensive means which at the same time are used for confining the angle of rotation.

It is a further object of the invention to provide a variable device of the type mentioned above, in which the said means are additionally used for influencing the torque exerted on the actuation shaft.

In accordance with the present invention, these objects are attained by a variable electromechanical device, which comprises a housing having a bore, an actuation shaft rotatably mounted in the bore and having an annular groove, a portion of the housing being displaced by stamping to extend into the annular groove of the shaft for preventing axial movement of the shaft within the bore, and at least one projection formed on the shaft within the annular groove to cooperate with the displaced portion for limiting the rotation of the shaft relative to the housing. Preferably, the annular groove is filled with a high-viscosity liquid, and a passage is formed on the projection to allow the liquid to pass from one side of the projection to the other side thereof when the shaft is rotated.

DETAILED DESCRIPTION OF THE PREFERRED EMBODIMENTS

Figure 1:
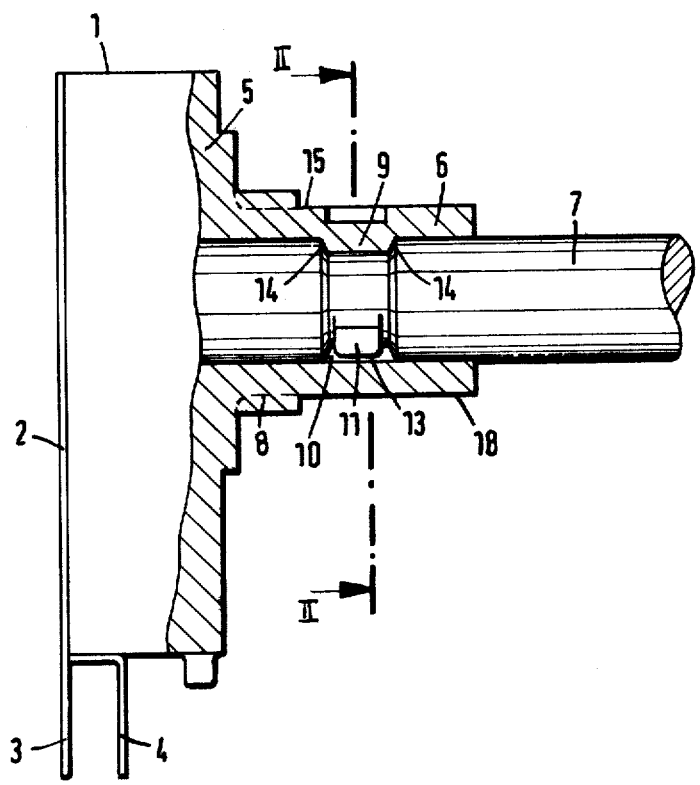
FIG. 1 is a side view of a rotary potentiometer, partly in axial section.

While the invention is illustrated in FIG. 1 in the embodiment of a variable resistor, it is applicable to all electromechanical devices, such as rotary switches, which are actuated by a shaft. Since the type and actual structure of the variable resistor are of no significance to the invention, no details thereof have been shown in FIG. 1. A potentiometer housing is generally designated by 1, which accommodates a resistance element (not shown) and a collector (not shown). These two elements are bridged by a wiper spring (not shown) mounted on a spring carrier (not shown). The spring carrier is rotated by means of an actuation shaft 7. Soldering lugs 4 of the resistance element extend downwardly from the housing 1. A shielding plate 2 is provided at the rear side of the housing 1, soldering lugs 3 of the shielding plate 2 also projecting downwardly from the housing. By means of these soldering lugs 3, 4, the potentiometer may be soldered to a printed circuit board (not shown) and electrically connected to conductor strips provided on such circuit board.

The housing 1 is provided with an annular flange 5 having an extension in the form of a sleeve 6. A thread 8 is cut on the sleeve 6 and serves to mount the housing 1 on a supporting structure in cooperation with a nut (not shown). The actuation shaft 7 extends through the sleeve 6 and is provided with an annular groove 10 in a portion located inside the sleeve 6. A projection 11 extends radially in the annular groove 10 from the bottom thereof. The radial height of the projection 11 is so dimensioned that it does not extend beyond the outer diameter of the actuation shaft 7.

Figure 2:
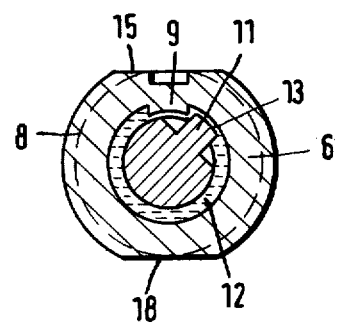
FIG. 2 is a cross section taken along the line II—II in FIG. 1, with the shaft shown in a different rotational position.

The sleeve 6 is provided in its threaded portion with two flattenings 15, 18, which are disposed diametrically opposite to each other. These flattenings extend over limited angles so that the function of the thread 8 in cooperation with a nut is practically no encumbered. After the actuation shaft 7 has been inserted in the bore of the sleeve 6, an approximately rectangular portion of the sleeve 6 in the region of the flattening 15 is displaced by means of a stamp towards the axis of the bore to extend into the annular groove 10. During this operation, the sleeve 6 is placed with its flattening 18 on the table of the stamping press. In FIGS. 1 and 2, the displaced portion of the sleeve 6 is shown at 9. The displacement is performed by a maximum of 50 percent of the thickness of the sleeve wall to ensure that the displaced portion 9 remains solidly and securely connected to the sleeve 6. The displaced portion 9 and the projection 11 cooperate to limit the rotational range of the actuation shaft 7 relative to the sleeve 6. If desired or required, it is also possible to provide more than one displaced portion 9 or more than one projection 11.

Both axial end faces 14 of the annular groove 10 are chamfered, which is of significance in forming the displaced portion 9. The inclination angle of these chamfered end faces 14 is selected such that no significant axial play is left after the formation of the displaced portion 9. In the stamping process, the material of the displaced portion slightly returns upon removal of the stamp due to its inherent resiliency thereby forming a very slight clearance so that the actuation shaft 7 is freely rotatable in the bore of the flange 6. It is preferable to form the displaced portion 9 rectangular. Both the shaft 7 and the sleeve 6 may be formed of either metal or a synthetic material. The sleeve 6 may also be formed of sheet metal with a rim, or a cube.

Figure 3:
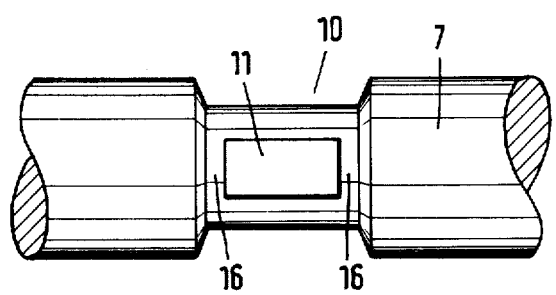
FIG. 3 is a side view of part of the actuation shaft used in FIG. 1.

Before the actuation shaft 7 is inserted in the sleeve 6, the annular groove 10 is filled with a liquid 12 of high viscosity which serves as a braking and lubricating agent. When the portion 9 is displaced by stamping, the liquid provided at this location is pressed between the actuation shaft 7 and the bore wall of the sleeve 6 thereby providing excellent lubrication. As mentioned, the liquid also serves as a braking agent, because when the actuation shaft 7 is rotated so as to remove the projection 11 from the displaced portion 9 the liquid is forced to flow past the projection 11 into the new chamber being created. To permit such flow, the projection 11 is provided with passages. These passages may be formed by a gap 13 between the peripheral surface of the projection 11 and the bore wall of the sleeve 6, as shown in FIGS. 1 and 2. Further passages 16 may be provided at the axial ends of the projection 11, as shown in FIG. 3, in which the projection does not extend over the entire axial length of the annular groove 10.

Figure 4:
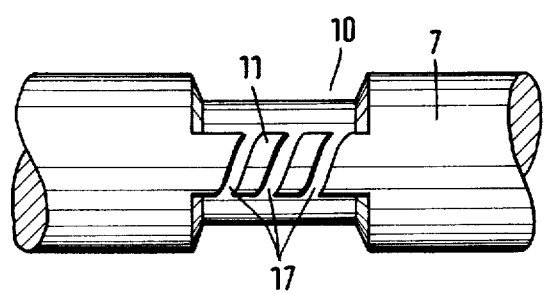
FIG. 4 is a view similar to that of FIG. 3 showing a different embodiment of the actuation shaft.

The passages mentioned above extend in the peripheral direction of the actuation shaft 7. As shown in FIG. 4, it is also possible to provide passages in the form of channels 17 which extend at an angle with respect to the peripheral direction. The size of this angle and the proper selection of the viscosity of the liquid allow a control of the torque exerted on the shaft within certain limits. To ensure that the liquid is forced through the passages rather than into the clearance between the actuation shaft 7 and the bore of the sleeve 6, when the shaft is rotated, it is required to make the flow resistance of the passages substantially smaller than that existing between the shaft and the sleeve bore.

We claim:
1. A variable electromechanical device, comprising
   (a) a housing having a bore;
   (b) an actuation shaft rotatably mounted in the bore and having an annular groove;
   (c) a portion of the housing being displaced by stamping to extend into the annular groove of the shaft for preventing axial movement of the shaft within the bore;
   (d) at least one projection formed on the shaft within the annular groove to cooperate with said displaced portion for limiting the rotation of the shaft relative to the housing;
   (e) a high-viscosity liquid filling said annular groove, and
   (f) liquid passage means associated with said projection to allow said liquid to pass from one side of the projection to the other side thereof when the shaft is rotated.

2. The device of claim 1, wherein said annular groove has both of its axial end faces inclined at such an angle that there is no axial play after the stamping of said displaced portion.

3. The device of claim 1, wherein said displaced portion is substantially rectangular.

4. The device of claim 1, wherein said housing has a sleeve provided with a flattening, said displaced portion being located at said flattening.

5. The device of claim 1, wherein the flow resistance of said liquid passage means is substantially smaller than that existing between the shaft and the bore.

6. The device of claim 1, wherein said liquid passage means extends in the peripheral direction of the shaft.

7. The device of claim 1, wherein said liquid passage means extends at an angle with respect to the peripheral direction to the shaft.

* * * * *